United States Patent
Van Haute et al.

(10) Patent No.: US 11,649,182 B2
(45) Date of Patent: May 16, 2023

(54) METHOD OF REGULATING ONE OR MORE COMPONENT VALUES IN MONOCHLORAMINE PRODUCTION USING REAL-TIME ELECTROCHEMICAL SENSING

(71) Applicant: Buckman Laboratories International, Inc., Memphis, TN (US)

(72) Inventors: Eddie Van Haute, Memphis, TN (US); Luc Masure, Memphis, TN (US); Edmund Scott, Memphis, TN (US); Mark Conyngham, Memphis, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 504 days.

(21) Appl. No.: 16/632,186

(22) PCT Filed: Jul. 19, 2017

(86) PCT No.: PCT/US2017/042787
§ 371 (c)(1),
(2) Date: Jan. 17, 2020

(87) PCT Pub. No.: WO2019/017930
PCT Pub. Date: Jan. 24, 2019

(65) Prior Publication Data
US 2020/0231476 A1    Jul. 23, 2020

(51) Int. Cl.
*C02F 1/76*    (2023.01)
*C01B 21/09*    (2006.01)
(Continued)

(52) U.S. Cl.
CPC .............. *C02F 1/76* (2013.01); *C01B 21/091* (2013.01); *C02F 1/008* (2013.01);
(Continued)

(58) Field of Classification Search
CPC .......... C01B 21/091; C02F 1/008; C02F 1/76; C02F 2209/06; C02F 2209/29; C02F 2303/04; G01N 27/4168
See application file for complete search history.

(56) References Cited

U.S. PATENT DOCUMENTS

| 4,571,292 A | 2/1986 | Liu et al. |
| 8,142,641 B2 | 3/2012 | Birch et al. |

(Continued)

FOREIGN PATENT DOCUMENTS

| EP | 2669676 A2 | 4/2013 |
| WO | 2015000769 A1 | 1/2015 |

OTHER PUBLICATIONS

China National Intellectual Property Administration: First Office Action for corresponding Application No. 201780093294.9 (Issuing No. 2021112402586710) dated Nov. 29, 2021, 10 pages.
(Continued)

*Primary Examiner* — Terry K Cecil
(74) *Attorney, Agent, or Firm* — Patterson Intellectual Property Law P.C.; Gary L. Montle

(57) ABSTRACT

System (100) and method of automatically controlling an active oxidant concentration (e.g. sodium hypochlorite) for a process of producing monochloramine comprising applying metered amounts of an oxidant solution and an amine solution to a defined area (114). An electrochemical measurement device is provided in association with the oxidant solution and prior to the defined area, N comprising at least first and second electrodes and an output terminal. A predetermined voltage potential is applied across the first and second electrodes, wherein an obtained amperometric measurement corresponds to a real-time concentration of the active oxidant in the oxidant solution. A feedback signal is generated based on the obtained measurement via the output terminal to a controller (108), which automatically regulates,
(Continued)

in real-time and based at least in part on the control signal, the metered amount of oxidant solution provided to the defined area.

20 Claims, 3 Drawing Sheets

(51) Int. Cl.
*C02F 1/00* (2023.01)
*G01N 27/416* (2006.01)

(52) U.S. Cl.
CPC ...... *G01N 27/4168* (2013.01); *C02F 2209/29* (2013.01); *C02F 2303/04* (2013.01)

(56) References Cited

U.S. PATENT DOCUMENTS

| | | |
|---|---|---|
| 2012/0103823 A1 | 5/2012 | Dweik et al. |
| 2013/0292267 A1 | 11/2013 | McNeel et al. |
| 2013/0313128 A1 | 11/2013 | Fielden et al. |
| 2014/0110340 A1 | 4/2014 | White et al. |
| 2015/0203388 A1 | 7/2015 | Gotthardt et al. |
| 2015/0329387 A1 | 11/2015 | Sumrall et al. |
| 2015/0329391 A1 | 11/2015 | Garusi et al. |
| 2016/0282293 A1 | 9/2016 | Stacey et al. |

OTHER PUBLICATIONS

Del Camp, F. Javier, et al.: "Improved free chlorine amperometric sensor chip for drinking water applications," El Sevier Analytica Chimica Acta 554 (2005) 98-104, www.sciencedirect.com BNSDOCID: XP027731149A.

Engelhardt, Terry L., et al.: "Chlorination, Chloramination and Chlorine Measurement," Hach, BNSDOCI: XP055429601A.

International Searching Authority: International Search Report for International Patent Application No. PCT/US2017/042787, filed Jul. 19, 2017, dated Dec. 8, 2017.

METHOD OF REGULATING ONE OR MORE COMPONENT VALUES IN MONOCHLORAMINE PRODUCTION USING REAL-TIME ELECTROCHEMICAL SENSING

TECHNICAL FIELD

The present invention relates generally to a method for monitoring and controlling a concentrated oxidant source for the production of monochloramine. The present invention further relates to an apparatus and system for providing such monitoring and controlling steps and functions.

BACKGROUND ART

Monochloramine (MCA) has been implemented as an alternative to conventional chlorination for control of microbiological growth across a spectrum of industries including, e.g., pulp and paper industries, food and beverage processing, water treatment and industrial waste treatment facilities, and the like. Monochloramine is much more stable than free chlorine, does not dissipate as rapidly, and has a much lower tendency to convert organic materials into chlorocarbons such as chloroform and carbon tetrachloride.

Monochloramine also does not vaporize into the environment, but rather remains in solution when dissolved in aqueous solutions and does not ionize to form weak acids. This property is at least partly responsible for the biocidal effectiveness of monochloramine over a wide pH range.

One example of a conventional method for producing monochloramine includes mixing an oxidant (e.g., a solution of sodium hypochlorite), an amine source (e.g., a mixture of ammonia-containing substances) and water in a specific ratio using a monochloramine generator. The active oxidant (hypochlorite ion) and the active amine (ammonium ion) are preferably metered in a 1:1 molar ratio to ensure that the desired compound, monochloramine, is produced with maximum reproducibility, stability and efficiency. The chlorine source used in the generation of monochloramine may preferably be a solution of industrial bleach (sodium hypochlorite) with a concentration range generally between 10 and 16 percent (as chlorine). However, one of the main challenges in this process is that the bleach solution loses active concentration over time, exacerbated by factors such as temperature, UV (sunlight) and the presence of impurities. Manual tests need to be conducted on a regular basis to determine the active chlorine concentration of the bleach solution, which is then used to adjust the flow rate of the bleach in order to ensure that it reacts with the amine source in a 1:1 molar ratio. This manual process is both time consuming and involves the intervention of a skilled technician to ensure that the monochloramine generation process remains optimized.

Therefore, it would be desirable to directly measure the concentration of the bleach solution in an online context, and to further regulate the flow rate of the bleach solution automatically and substantially in real time.

DISCLOSURE OF THE INVENTION

In accordance with various exemplary systems and methods as disclosed herein, an electrochemical measurement device is configured for online sensing of the concentration of hypochlorite ions in an oxidant (bleach) solution. The active chlorine content of the bleach solution may be determined at regular intervals, which value may further be used to automatically calculate the optimum flow of bleach solution to achieve a 1:1 molar ratio with the amine source. Appropriate feedback of the measured value may accordingly be used to automatically adjust, e.g., a bleach metering pump to ensure that this 1:1 molar ratio is consistently maintained. This desirably eliminates the need for manual intervention to determine the active chlorine concentration of the bleach solution and to adjust the flow rate of the bleach, further ensuring that the system is substantially optimized at all times.

One particular embodiment of a method as disclosed herein is provided for automatically controlling an active oxidant concentration for a process of producing monochloramine comprising applying metered amounts of an oxidant solution and an amine solution to a defined area. An electrochemical measurement device is provided in association with the oxidant solution and prior to the defined area, said device comprising at least a first electrode, a second electrode and an output terminal. An amperometric measurement is obtained as corresponding to a real-time concentration of the active oxidant in the oxidant solution. A feedback signal is generated based on the obtained measurement via the output terminal, and the metered amount of oxidant solution provided to the defined area is automatically regulated, in real-time and based at least in part on the control signal. The feedback signal (or control output signal) corresponds to the measured real-time concentration of active oxidant as compared with respect to a target value corresponding to a desired molar ratio of the active oxidant and an active amine associated with the amine solution.

In another exemplary embodiment, the step in the aforementioned method of obtaining an amperometric measurement from the measurement device further comprises applying a predetermined voltage differential across the first and second electrodes, wherein a current induced thereby is measured as corresponding to a real-time concentration of the active oxidant in the oxidant solution.

In another exemplary embodiment, at least the first electrode comprises a boron-doped diamond electrode.

In another exemplary embodiment, the desired molar ratio of the active oxidant and the active amine source is 1:1.

In another exemplary embodiment, the real-time concentration of the active oxidant in the oxidant solution is determinable independent of a sensed pH value.

In another exemplary embodiment, the obtained measurement is an anodic measurement associated with an anodic oxidation process.

In an alternative embodiment, the obtained measurement is a sum of an anodic measurement associated with an anodic oxidation process and a cathodic measurement associated with a cathodic reduction process.

In accordance with the aforementioned embodiment, the anodic measurement and the cathodic measurement are taken sequentially. Alternatively, the anodic measurement and the cathodic measurement are obtained simultaneously using a plurality of first electrodes with respect to the second electrode.

In another exemplary embodiment, the defined area comprises a vessel as a first defined area including a reaction mixture for producing the monochloramine, wherein a second defined area is provided prior to the first defined area for obtaining the measurement corresponding to real-time concentration of the active oxidant in the oxidant solution.

Another exemplary embodiment includes automatically regulating, in real-time and based at least in part on the control signal, one or more of the metered amount of oxidant solution provided to the defined area and the metered amount of amine solution provided to the defined area.

In another exemplary embodiment, a system is provided comprising said electrochemical measurement device and a controller, said controller configured to perform the steps of any one or more of the aforementioned embodiments of a method.

In another exemplary embodiment, the system further comprises a housing within which is disposed each of the first and second electrodes, the output terminal and the controller. Alternatively, the system may comprise a housing within which is disposed each of the first and second electrodes, the output terminal and a first controller configured to obtain the amperometric measurement corresponding to the real-time concentration of the active oxidant in the oxidant solution, and to generate the feedback signal based on the obtained measurement via the output terminal to a second controller.

BEST MODE FOR CARRYING OUT THE INVENTION

Figure 1:
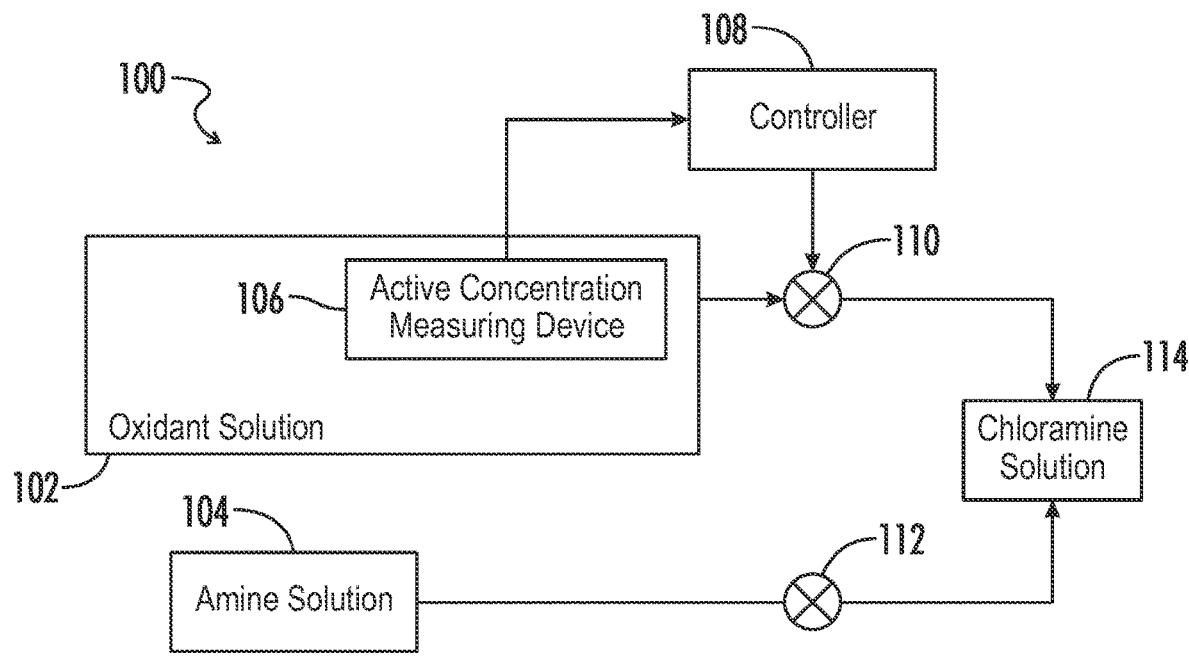
FIG. 1 is a simplified block diagram representing a first embodiment of a system as disclosed herein.

Referring generally to FIGS. 1-5, various exemplary embodiments of an invention may now be described in detail. Where the various figures may describe embodiments sharing various common elements and features with other embodiments, similar elements and features are given the same reference numerals and redundant description thereof may be omitted below.

Referring first to FIG. 1, an exemplary embodiment of a system 100 as disclosed herein may now be described in more detail. As previously noted, many oxidant products can have a relatively short life span, and therefore it is important to constantly monitor the oxidant concentration in treated solutions to maintain proper potency thereof. The system 100 as disclosed herein can be used, for example, to constantly monitor the total concentration of active oxidant in a bleach solution online and prior to feeding the bleach solution into a defined area associated with production of the end product such as, e.g., monochloramine. The term "online" as used herein may generally refer to the use of a sensing device or at least sensing device elements such as for example specially formed electrodes proximally located to the bleach solution and generating output signals in real time corresponding to the active oxidant concentration therein, as distinguished for example from manual or automated sample collection and "offline" analysis in a laboratory or through visual observation by one or more operators. Analysis results can be obtained in a relatively short period of time and used to rapidly generate feedback signals for process control based on the analysis results.

The exemplary system 100, in at least the non-limiting illustration of FIG. 1, includes a first supply 102 including a bleach solution and a second supply 104 including an amine solution, each of which are fed to a defined area 114 to form a mixture, such as a reaction mixture, from which a monochloramine product is produced. In various embodiments the monochloramine product can be applied, for example, to treatment of aqueous end solutions, such as waters, pulps, aqueous containing streams, and the like, and in certain alternative embodiments the supplied oxidant and amine reactants used to make the monochloramine product can be combined directly in the end solution for in-situ production of the treatment product, or the reactants can be combined onsite and in advance of the end solution. The defined area 114 in which the reactants are shown to be combined may comprise a vessel or line such as, for example, a tank, pipe, conduit, reactor, bath, stream, or container, and the like. Additional supply reactants, not shown in this illustration, can be used depending on the reaction chemistry involved.

An amperometric measuring device 106 is configured to produce a feedback signal that is directly proportional to the amount of the active reaction product (i.e., hypochlorite ion) in the oxidant solution 102. The feedback signal is provided to a controller 108 which is further programmed, for example, to compare the feedback signal received or otherwise acquired from the measurement device 106 with a signal that can correspond to a desired level of the active oxidant (hypochlorite), needed in combination with a known amount of the active amine (ammonium ion) in the amine solution 104, to produce a desired or selected concentration of the monochloramine product in the defined area 114. In this respect, the controller 108 can send a control signal to a valve or pump 110 or similar flow control means based on the feedback signal to make adjustments in the feed rate of the oxidant solution to the defined area 114.

The feed rate of the amine solution to the defined area 114 can be controlled, for example, using a separate valve or pump 112. In an alternative embodiment (not shown), the controller 108 may be configured to regulate the feed rate of either or both of the oxidant solution and the amine solution based on the online measurement of the active oxidant and further in view of a desired molar ratio, as per the requirements of the monochloramine production process.

A user interface (not shown) may further be coupled to the controller and/or electrochemical measuring device, and configured to display measurement results, control parameters, oxidant flow rates, or the like, and potentially further to enable operator input regarding measurement and/or control parameters. The term "user interface" as used herein may unless otherwise stated include any input-output module with respect to the controller or a hosted data server coupled therewith, and including but not limited to: a stationary operator panel with keyed data entry, touch screen, buttons, dials or the like; web portals, such as individual web pages or those collectively defining a hosted website; mobile device applications, and the like.

Certain embodiments of a system as disclosed herein may be fully automatic in implementation, without requiring or prompting human intervention via, e.g., the user interface. The system may otherwise be selectively configured for one or more intermediate steps wherein operators or other authorized personnel can approve or modify automated control adjustments. For example, the controller may be configured to determine an amount and direction of recommended adjustment to the bleach control valve and generate a notification for delivery to a designated user interface such as an operator dashboard, mobile app on a phone, etc. The authorized personnel may accordingly be prompted to provide feedback, via for example approval or edits to the recommended adjustment, wherein the controller resumes automated control of the bleach control valve based thereon.

Figure 2:
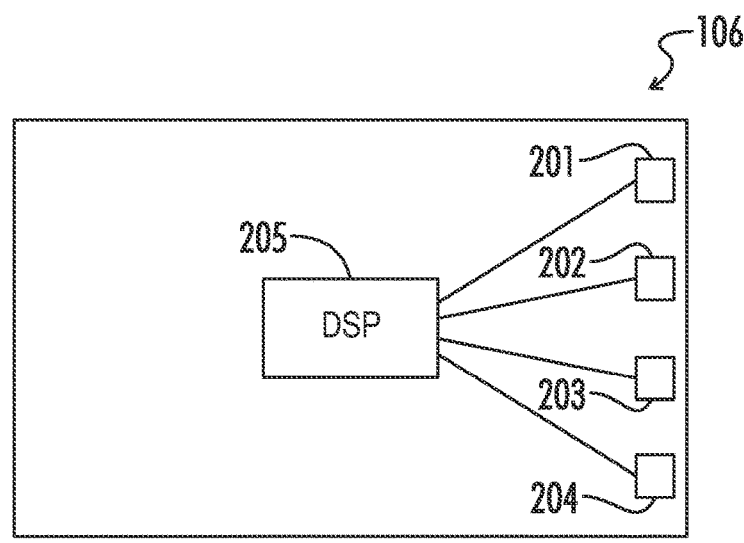
FIG. 2 is a simplified block diagram representing an exemplary electrochemical measurement device for the embodiment of the system of FIG. 1.

An exemplary embodiment of an amperometric electrochemical measurement device 106 as disclosed herein may now be described, further by reference to FIG. 2. In this example, the electrochemical measurement device 106 comprises an enclosed unit with a housing having at least one first (i.e., working) electrode 201 and a second (auxiliary) electrode 202 arranged along a working surface so as to substantially engage the aqueous oxidant solution when the housing is disposed in association therewith. An additional one or more working electrodes 203 may optionally be provided, along with for example a reference electrode 204 or the like. The various electrodes are coupled to an internal controller 205 having for example digital signal processing capabilities. The internal controller 205 is coupled to an output terminal whereby a feedback signal may be generated and transmitted from the internal controller to the (external) process controller 108.

In one example, the device housing may be generally elongated with a working surface having the first electrode 201 and the second electrode 202 provided at one end face of the housing. In another example, the first electrode 201 and the second electrode 202 are configured as distributed in nature relative to the internal controller 205, wherein for example the electrodes may be individually disposed with respect to the oxidant solution and without dedicated device housing. Accordingly, the device 106 may be effectively described in various embodiments as a portable and stand-alone unit, or as a distributed and modular unit, equally within the scope of the present disclosure.

In one example configuration, one or more working electrodes 201 may be disposed at or about a geometrically central portion of a working surface, wherein the auxiliary electrode 202 may further be disposed as an annular ring at the working surface and surrounding the one or more working electrodes 201. The first electrode and the second electrode may be directly exposed to a flow of aqueous oxidant solution, which for example may approach along a path substantially perpendicular to the measuring surface and be disbursed across at least the first and second electrodes. Alternatively, the first and second electrodes may be enclosed or otherwise presented with separation from the aqueous flow of oxidant solution via a porous membrane, wherein the hypochlorite diffuses through the porous membrane to the surface of the measuring area. The membrane may in an embodiment be selectively permeable with respect to each of the particular active oxidants at issue, namely, hypochlorous acid and hypochlorite ion. An electrolyte may further be provided between the porous membrane and the measuring surface, so as to potentially facilitate chemical reactions for electrochemical detection of the particular active oxidants.

In a particularly desirable embodiment, at least the first (working) electrode comprises boron doped diamond (BDD). It is desirable, for example in view of the cathodic-anodic measurement combination as further discussed below, to provide electrode materials having relatively high cathodic and anodic potential range. BDD provides, inter alia, a low native background current across a wide range of voltage potentials that can be implemented for both of cathodic and anodic amperometric measurements.

Figure 3:
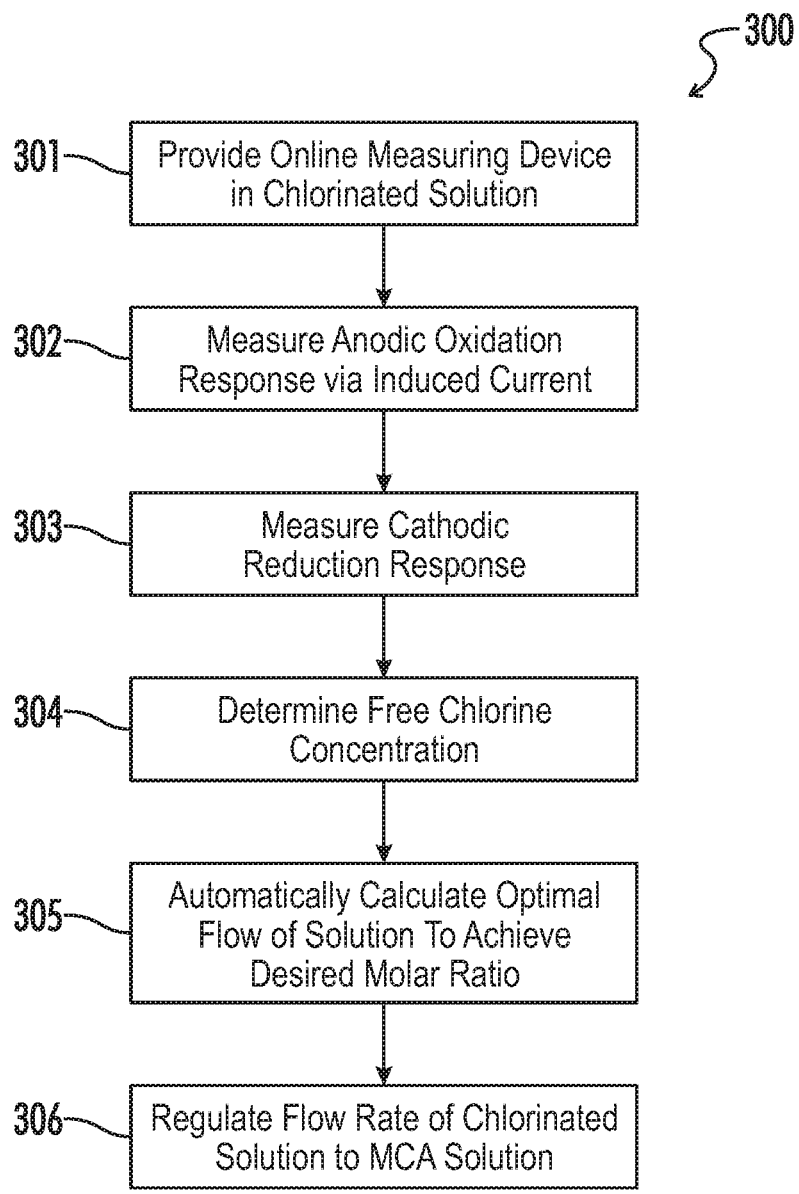
FIG. 3 is a flowchart representing an exemplary embodiment of a method as disclosed herein.

Referring next to FIG. 3, an exemplary embodiment of a method 300 may further be described in greater detail. Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

An exemplary first step 301 comprises providing the aforementioned electrochemical measurement device 106 in or otherwise in association with the oxidant solution being supplied to the defined area for monochloramine production. Accordingly, the subsequent steps of the method 300 are preferably performed online and substantially in real time with respect to the monochloramine production process.

An exemplary second step 302 comprises measuring an anodic oxidation process to provide a measurement corresponding to a concentration of hypochlorite ion in the oxidant solution, whereas an exemplary third step 303 comprises measuring a cathodic reduction process to provide a measurement corresponding to a concentration of hypochlorous acid in the oxidant solution. In various embodiments, the cathodic and anodic measuring steps may be performed sequentially and in the order stated, or in a reverse order with respect to the order stated, using a single working electrode 201. Alternatively, the cathodic and anodic measuring steps may in accordance with a method as disclosed herein be performed simultaneously using two separate working electrodes 201, 203.

In an embodiment, the measurements in steps 302 and 303 are obtained by applying a predetermined voltage potential difference across at least the first (working) electrode 201 and the second (auxiliary) electrode 202, wherein a current is induced to flow through the first electrode 201. The auxiliary electrode 202 may be biased relative to the relevant working electrode 201, or vice versa, with the other being held at or near a ground potential for the amperometric device.

For determining the voltage potential to be applied, the device may in certain embodiments be calibrated or otherwise perform a preliminary sweep of measurements across a range of voltage potentials, with measurements being collected continuously, periodically, or at defined intervals throughout the range. The voltage potential sweep may in an embodiment be linear, or alternatively may be non-linear such as for example step-wise, curvilinear, cyclical, etc. The system may accordingly identify relevant measurement points within the voltage potential sweep, or in other words identify a voltage potential for which observed anodic response is substantially linear with respect to an ideal linear regression. In a particular embodiment, the amperometric measurement device may be calibrated by adjusting an applied voltage potential to produce a substantially linear response at or substantially about a point where a directional deviation in the response curve inverts or reverses. For example, when the voltage potential is lower than ideal, the response curve may demonstrably deviate in a first direction with respect to an ideal linear regression, whereas when the voltage potential is higher than ideal the response curve may demonstrably deviate in an opposing direction with respect to the ideal linear regression. The calibration or preliminary operating step may therefore include a step of providing the predetermined voltage potential as the point wherein the direction of deviation inverts or reverses.

Returning to the measurement process, the induced current is measured by the device as a function of time. In the anodic (oxidation) measurement process of step 302, the measurement (i.e., electrons drawn from the anode) is processed as being representative of the concentration of hypochlorite ion in the oxidant solution, while in the cathodic (reduction) measurement process of step 303 the measurement (i.e., electrons consumed at the cathode) is processed as being representative of the concentration of hypochlorous acid in the oxidant solution.

Figure 4:
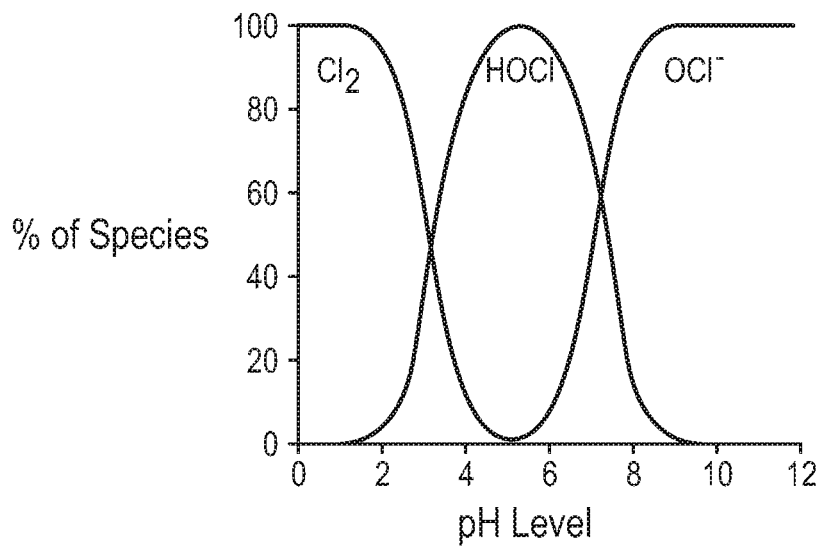
FIG. 4 is a graphical diagram representing speciation of hypochlorous acid (HOCl) and hypochlorite ion (OCl–) in water, illustrated with respect to pH levels.

A concentration of total free chlorine in the oxidant solution can be determined (step 304) by simply summing the measured values from steps 302 and 303. The relative proportions of hypochlorous acid and hypochlorite ion in the aqueous bleach solution is controlled principally by the pH of the water, with temperature also having some effect. FIG. 4 illustrates this effect, with the relative proportions being distributed across a range of pH values. As shown, changes in the pH value of the oxidant solution dramatically affect the relative concentrations of the hypochlorous acid (HOCl) species and the hypochlorite ion (OCl$^-$) species. As the pH value of the solution increases, the concentration of free hypochlorous acid in solution decreases, and vice versa for the hypochlorite ion. Certain conventional amperometric sensing techniques include regulating of fixing the pH value of the solution at the cathode, for example via application of a chemical reagent. However, the above-referenced embodiment of an electrochemical measurement device as used herein implements both cathodic and anodic measurements via BDD working electrodes to determine the relative concentrations of the hypochlorous acid (HOCl) species and the hypochlorite ion (OCl$^-$) species, independently of the pH value in the solution. In other words, through sequential or simultaneous measurement of the relevant species, the amount of active oxidant in the solution can be determined across the effective range of permissible pH values for the solution, as the sum of the relative concentrations of the constituent species. While the same result may be provided alongside buffering and regulation of the pH value of the solution, such a step is not required for a method of the present invention.

It may be noted that at pH values substantially about 9, the hypochlorite ion is significantly larger in proportion with respect to the hypochlorous acid in the solution. Accordingly, in certain processes wherein the pH value of the aqueous solution is near or even substantially above 9, it may be possible to provide the determined concentration of total free chlorine in the oxidant solution without even performing steps 303 and 304. In other words, the result from the anodic measurement process would in this case be representative of the concentration of hypochlorite ion in the solution, which in turn is approximately the concentration of total free chlorine in the solution, as the amount of hypochlorite ion represents substantially all of the active oxidant at the higher pH values.

In an embodiment, the determined concentration of total free chlorine is represented in a feedback signal that is transmitted from the measurement device to the controller. Alternatively, raw values may be transmitted as feedback signals back to the controller or other distributed processing circuitry wherein the concentration of total free chlorine is determined.

In a fifth step 305, the controller is configured to automatically calculate an optimal flow of oxidant (bleach) solution to achieve a desired molar ratio for the active oxidant (e.g., hypochlorite ion) with respect to the active amine (e.g., ammonium ion). One of skill in the art may appreciate that the total oxidant concentration of monochloramine product in a reaction mixture can be very dependent upon the molar ratio of bleach and ammonia used to prepare the mixture. Referring for example to FIG. 4, results are illustrated from a test wherein several mixtures of bleach and ammonia at different blending ratios thereof were prepared and the reaction products (i.e., monochloramine) produced by the mixtures were analyzed using an iodometric titration procedure and plotted.

Figure 5:
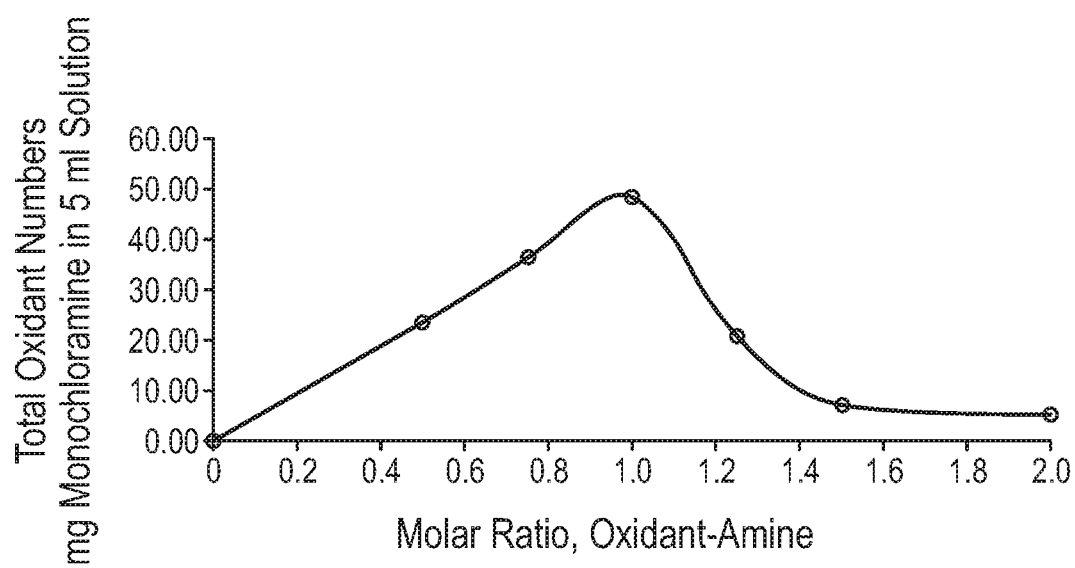
FIG. 5 is a graphical diagram representing total oxidant values as MCA in a 5 mL solution, relative to varying molar ratios of active oxidant and active amine.

As shown by FIG. 5, the concentration of total oxidant (monochloramine) in the reaction product made from the reaction of bleach and ammonia can be very sensitive to the molar blend ratio of the reactants with regards to achieving optimal strength, and has a maximal value near equimolar blends of the reactants, wherein the potency drops off significantly and rapidly if the relative amount of bleach is too high or low relative to the amount of ammonia used in the reaction. Controlling the molar ratio of bleach to ammonia may also be characterized as a safety feature, as the reaction of bleach and ammonia can become dangerously hot and violent if the bleach concentration significantly exceeds the ammonia concentration.

An exemplary system and method as disclosed herein therefore further provides improved process control (step 306) to keep the reactant blend ratio at or near the ideal molar ratio (i.e., 1:1), for providing oxidant product in high concentrations. For example, in a principal embodiment wherein the ammonia feed rate is fixed, the bleach feed rate can be adjusted up or down, based on a feedback signal generated by the electrochemical measurement device and corresponding to a concentration of hypochlorite in the oxidant solution. The process control operation may be proportional in nature, wherein the controller identifies a directional aspect of the desired correction in order to obtain (or drive the system towards) an optimal molar ratio, and the process control operation may in certain embodiments further include an integral and/or derivative aspect wherein the corrective steps account for a rate of change over time to substantially prevent overshooting.

In an alternative embodiment, the ammonia reactant may also be adjusted based on a separate control signal, having been generated by the controller based on the same feedback signal from the electrochemical measurement device.

Throughout the specification and claims, the following terms take at least the meanings explicitly associated herein, unless the context dictates otherwise. The meanings identified below do not necessarily limit the terms, but merely provide illustrative examples for the terms.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein.

A general-purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The meaning of "a," "an," and "the" may include plural references, and the meaning of "in" may include "in" and "on."

The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for automatically controlling an active oxidant concentration for a process of producing monochloramine that comprises applying metered amounts of an oxidant solution from a first supply location and an amine solution from a second supply location to a defined area, wherein the system comprises:
an electrochemical measurement device associated with the oxidant solution at the first supply location prior to the defined area, the device comprising at least a first electrode, a second electrode and an output terminal, wherein the device is configured to generate a feedback signal via the output terminal, wherein the feedback signal is based on an amperometric measurement corresponding to a real-time concentration of active oxidant in the oxidant solution at the first supply location; and
a controller configured to automatically regulate, in real-time and based at least in part on the feedback signal, the metered amount of oxidant solution provided from the first supply location to the defined area, wherein the automatic regulation corresponds to the measured real-time concentration of active oxidant as compared with respect to a target value corresponding to a desired molar ratio of the active oxidant and an active amine associated with the amine solution.

2. The system of claim 1, wherein the electrochemical measurement device further comprises a housing within which is disposed each of the first and second electrodes, the output terminal, and a first controller configured to obtain the amperometric measurement and generate the feedback signal to a second controller which automatically regulates the metered amount of oxidant solution provided to the defined area.

3. The system of claim 1, wherein the electrochemical measurement device is configured to obtain an amperometric measurement by applying a predetermined voltage differential across the first and second electrodes, wherein a current induced thereby is measured as corresponding to a real-time concentration of the active oxidant in the oxidant solution.

4. The system of claim 1, wherein the real-time concentration of the active oxidant in the oxidant solution is determinable independent of a sensed pH value.

5. The system of claim 1, wherein the desired molar ratio of the active oxidant and the active amine source is 1:1.

6. The system of claim 1, wherein the amperometric measurement is an anodic measurement associated with an anodic oxidation process.

7. The system of claim 1, wherein the amperometric measurement is a sum of an anodic measurement associated with an anodic oxidation process and a cathodic measurement associated with a cathodic reduction process.

8. The system of claim 7, wherein the anodic measurement and the cathodic measurement are taken simultaneously.

9. The system of claim 8, wherein one or more of the anodic measurement and the cathodic measurement are obtained using a plurality of first electrodes with respect to the second electrode.

10. The system of claim 1, wherein the controller is further configured to:
generate a recommended adjustment in the metered amount of oxidant solution provided to the defined area;
deliver an electronic notification of the recommended adjustment to a user interface; and
commence the automatic regulation upon receiving user approval of, or modification to, the recommended adjustment.

11. The system of claim 1, wherein:
the defined area comprises a vessel as a first defined area including a reaction mixture for producing the monochloramine, and wherein a second defined area is provided prior to the first defined area for obtaining the measurement corresponding to real-time concentration of the active oxidant in the oxidant solution.

12. A method of automatically controlling an active oxidant concentration for a process of producing monochloramine that comprises applying metered amounts of an oxidant solution from a first supply location and an amine solution from a second supply location to a defined area, wherein the method comprises:
providing an electrochemical measurement device in association with the oxidant solution at the first supply location and prior to the defined area, said device comprising at least a first electrode, a second electrode and an output terminal;
obtaining an amperometric measurement corresponding to a real-time concentration of active oxidant in the oxidant solution at the first supply location;
generating a feedback signal based on the obtained measurement via the output terminal; and
automatically regulating, in real-time and based at least in part on the feedback signal, the metered amount of oxidant solution provided from the first supply location to the defined area, wherein the automatic regulation corresponds to the measured real-time concentration of active oxidant as compared with respect to a target value corresponding to a desired molar ratio of the active oxidant and an active amine associated with the amine solution.

13. The method of claim 12, wherein the step of obtaining an amperometric measurement from the measurement device further comprises applying a predetermined voltage differential across the first and second electrodes, wherein a current induced thereby is measured as corresponding to a real-time concentration of the active oxidant in the oxidant solution.

14. The method of claim 12, wherein:
the amperometric measurement is obtained using both cathodic and anodic measurements via boron doped diamond working electrodes, and the relative concentrations of an active oxidant and an active amine are determined independently of a sensed pH value.

15. The method of claim 12, wherein:
the obtained measurement is an anodic measurement associated with an anodic oxidation process.

16. The method of claim 12, wherein:
the obtained measurement is a sum of an anodic measurement associated with an anodic oxidation process and a cathodic measurement associated with a cathodic reduction process, and the anodic measurement and the cathodic measurement are taken simultaneously.

17. The method of claim 16, wherein:
one or more of the anodic measurement and the cathodic measurement are obtained using a plurality of first electrodes with respect to the second electrode.

18. The method of claim 12, further comprising:
generating a recommended adjustment in the metered amount of oxidant solution provided to the defined area;
delivering an electronic notification of the recommended adjustment to a user interface; and
commencing the automatic regulation upon receiving user approval of, or modification to, the recommended adjustment.

19. The method of claim 12, wherein:
the defined area comprises a vessel as a first defined area including a reaction mixture for producing the monochloramine, and wherein a second defined area is provided prior to the first defined area for obtaining the measurement corresponding to real-time concentration of the active oxidant in the oxidant solution.

20. The method of claim 12, further comprising:
automatically regulating, in real-time and based at least in part on the feedback signal, one or more of the metered amount of oxidant solution provided to the defined area and the metered amount of amine solution provided to the defined area.

* * * * *